United States Patent [19]
Barker et al.

[11] Patent Number: 5,922,494
[45] Date of Patent: Jul. 13, 1999

[54] STABILIZED ELECTROLYTE FOR ELECTROCHEMICAL CELLS AND BATTERIES

[75] Inventors: Jeremy Barker; Feng Gao, both of Henderson, Nev.

[73] Assignee: Valence Technology, Inc., Henderson, Nev.

[21] Appl. No.: 08/843,203

[22] Filed: Apr. 14, 1997

[51] Int. Cl.$^6$ .................................................. H01M 10/40
[52] U.S. Cl. ........................................................... 429/342
[58] Field of Search ..................................... 429/194, 197

[56] References Cited

U.S. PATENT DOCUMENTS

| | | | |
|---|---|---|---|
| 3,544,385 | 12/1970 | Newman . | |
| 5,192,629 | 3/1993 | Guyomard | 429/197 |
| 5,206,408 | 4/1993 | Liotta, Jr. | 558/277 |
| 5,206,409 | 4/1993 | Romano et al. | 558/277 |
| 5,352,548 | 10/1994 | Fujimoto et al. | 429/197 |
| 5,418,091 | 5/1995 | Gozdz et al. | 429/252 |
| 5,451,477 | 9/1995 | Omaru et al. | 429/218 |
| 5,456,000 | 10/1995 | Gozdz et al. | 29/623.2 |
| 5,460,904 | 10/1995 | Gozdz et al. | 429/192 |
| 5,521,027 | 5/1996 | Okuno et al. | 429/194 |
| 5,525,443 | 6/1996 | Okuno et al. | 429/194 |
| 5,534,649 | 7/1996 | Cho et al. | 558/277 |
| 5,563,288 | 10/1996 | Bastron | 558/276 |
| 5,580,684 | 12/1996 | Yokoyama et al. | 429/194 |
| 5,643,695 | 7/1997 | Barker et al. | 429/197 |
| 5,714,280 | 2/1998 | Nakano et al. | 429/197 |

FOREIGN PATENT DOCUMENTS

| | | | |
|---|---|---|---|
| 731477 | 9/1996 | European Pat. Off. | H01G 9/038 |
| 5-299118 | 11/1993 | Japan | H01M 10/40 |
| 06290802 A2 | 10/1994 | Japan . | |
| 8-115724 | 5/1996 | Japan | H01M 10/40 |
| 8-171934 | 7/1996 | Japan | H01M 10/40 |

OTHER PUBLICATIONS

Ein–Eli et al., "The superiority of Asmmetric Alkyl Methyl Carbonates", J. Electrochem Soc., vol. 145 (1) pp. L1–L3, Jan. 1998.

Ein–Eli et al., "Methyl Propyl Carbonate: A Promising single Solvent for Li–ion Batteryb Electrolytes", J. Electrochem, Soc, vol. 144 (7) pp. L181–L184, Jul. 1997.

*Primary Examiner*—Maria Nuzzolillo
*Assistant Examiner*—Carol Chaney
*Attorney, Agent, or Firm*—Young & Basile, P.C.

[57] ABSTRACT

An electrochemical cell comprising a first electrode; a counter-electrode which forms an electrochemical couple with the first electrode; and an electrolyte comprising a solvent and a solute. The solvent comprises a dialkyl carbonate of the formula R'OCOOR" where each of R' and R' represents an alkyl, and having at least one of R' and R" selected from the group consisting of non-linear, branched alkyls where R' and R" are preferably different from one another.

21 Claims, 3 Drawing Sheets

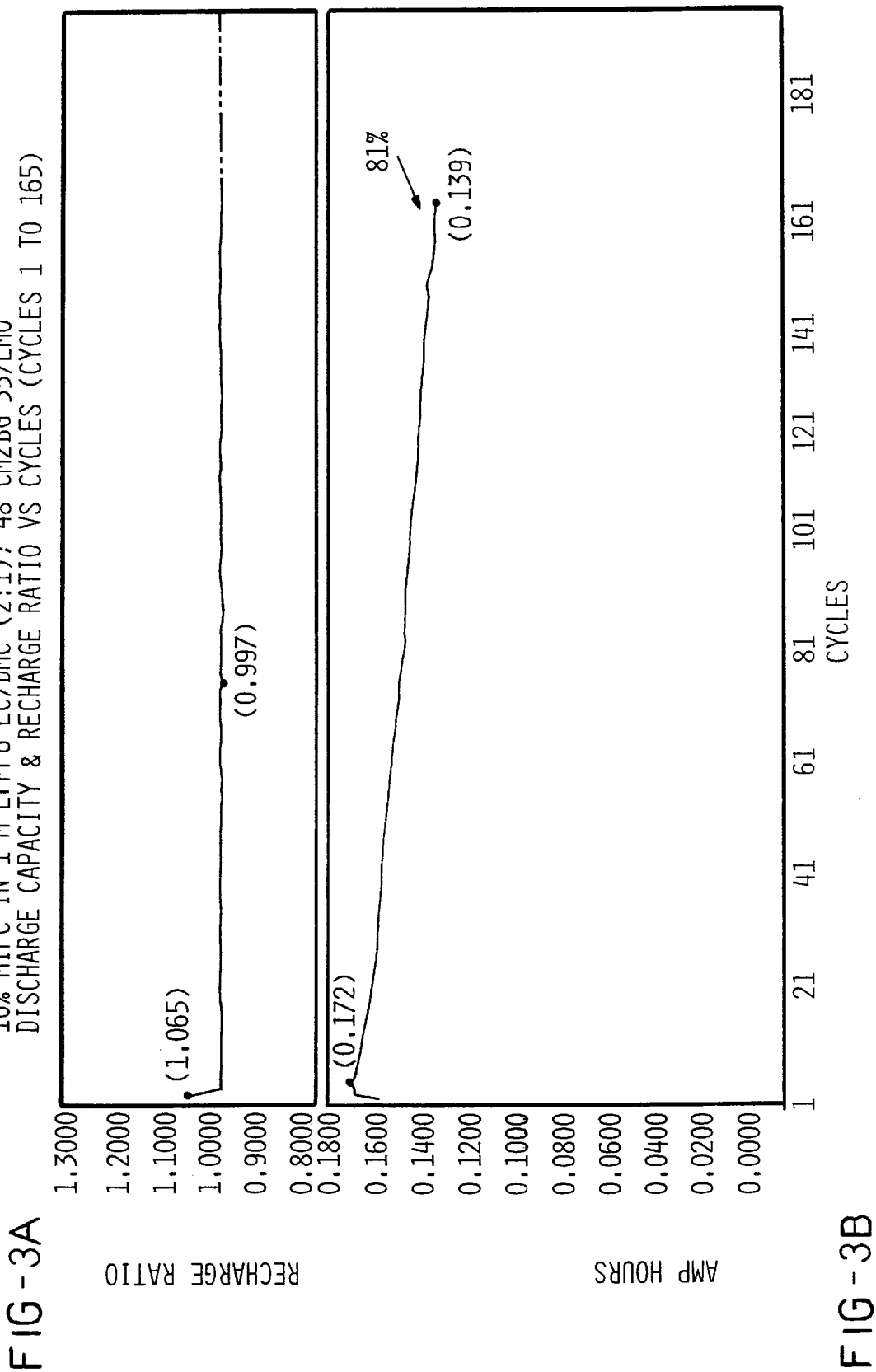

STABILIZED ELECTROLYTE FOR ELECTROCHEMICAL CELLS AND BATTERIES

FIELD OF THE INVENTION

This invention relates to electrochemical cells and batteries, and more particularly, to improved electrolytes for such batteries.

BACKGROUND OF THE INVENTION

Lithium batteries are prepared from one or more lithium electrochemical cells. Such cells have included an anode (negative electrode), a cathode (positive electrode), and an electrolyte interposed between electrically insulated, spaced apart positive and negative electrodes. The electrolyte typically comprises a salt of lithium dissolved in one or more solvents, typically nonaqueous (aprotic) organic solvents. By convention, during discharge of the cell, the negative electrode of the cell is defined as the anode. During use of the cell, lithium ions (Li+) are transferred to the negative electrode on charging. During discharge, lithium ions (Li+) are transferred from the negative electrode (anode) to the positive electrode (cathode). Upon subsequent charge and discharge, the lithium ions (Li+) are transported between the electrodes. Cells having metallic lithium anode and metal chalcogenide cathode are charged in an initial condition. During discharge, lithium ions from the metallic anode pass through the liquid electrolyte to the electrochemically active material of the cathode whereupon electrical energy is released. During charging, the flow of lithium ions is reversed and they are transferred from the positive electrode active material through the ion conducting electrolyte and then back to the lithium negative electrode.

The lithium metal anode has been replaced with a carbon anode, that is, a carbonaceous material, such as non-graphitic amorphous coke, graphitic carbon, or graphites, which are intercalation compounds. This presents a relatively advantageous and safer approach to rechargeable lithium as it replaces lithium metal with a material capable of reversibly intercalating lithium ions, thereby providing the sole called "rocking chair" battery in which lithium ions "rock" between the intercalation electrodes during the charging/discharging/recharging cycles. Such lithium metal free cells may thus be viewed as comprising two lithium ion intercalating (absorbing) electrode "sponges" separated by a lithium ion conducting electrolyte usually comprising a lithium salt dissolved in nonaqueous solvent or a mixture of such solvents. Numerous such electrolytes, salts, and solvents are known in the art. Such carbon anodes may be prelithiated prior to assembly within the cell having the cathode intercalation material.

In a battery or a cell utilizing a lithium-containing electrode it is important to eliminate as many impurities as possible which may affect cell performance. More particularly, the rechargeability of a lithium metal foil electrode is limited by side reactions between metallic lithium and impurities. When impurities react with lithium there is formed a solid surface layer on the lithium which increases the impedance of the anode (negative electrode). Non-metallic, carbon anodes are also subject to passivation through reaction with cell impurities.

Loss of performance due to impurities and undesired side reactions has lead to the selection of solvents and salts which are less reactive with cell components. Yet, this avoids use of some solvents and salts which would have better performance in a cell as compared to their less reactive counterparts. Therefore, what is needed is an understanding of the mechanisms causing undesirable loss of performance and reduce battery life cycle. Although interaction with metallic lithium has now been resolved by eliminating the use of the metallic lithium, yet there still remains the challenge of determining how to prevent undesired side reactions especially those involving formation of gas in cells.

SUMMARY OF THE INVENTION

The present invention provides a novel electrolyte solvent and method for preventing decomposition of one or more electrochemical components and for preventing undesired gaseous by-products resulting from the decomposition which may lead to volumetric expansion of an electrochemical cell and possible rupture. The novel electrolyte solvent of the invention is usable with a variety of carbonaceous and metal oxide electrode active materials, providing improved performance without decomposition and gas formation which occur with other solvents. The invention provides an electrolyte stabilized against decomposition during cyclic operation of an electrochemical cell. The electrolyte includes a specifically selected class of new solvents which are resistant to decomposition and formation of gaseous by-products resulting from decomposition. The new solvents, when used as co-solvents, stabilize other solvents in the solvent mixture. The solvents of the invention are generally characterized as non-linear carbonates with lower melting points and higher boiling points compared to the range observed for commonly used linear solvents, such as dimethyl carbonate or diethyl carbonate. The novel, non-linear carbonates of the invention have further lower melting points and higher boiling points than conventional solvents. The novel solvents are useful as both high and low temperature solvents. The compounds usable as solvents according to the invention are carbonates of the general formula R'OCOOR" where at least one of the R' and R" is a non-linear, branched hydrocarbon group. R' and R" are alkyls which may be different or the same, but are preferably different from one another. When R' and R" are different from one another, the carbonate is an unsymmetric, acyclic, non-linear, branched carbonate. It is preferred that the carbonate of the general formula R'OCOOR" have R' selected from the group of n-alkyl having 1 to 2 carbons; and R" is a branched alkyl having 3 to 7 carbons, and preferably 3 to 5 carbons. It is preferred that R' has at least 1 carbon and no more carbons than R". It is preferred that R" has at least 3 carbons and up to x number of carbons where x is selected to provide a viscosity of less than 0.90 cp at 25° C. A further limitation to the upper limit of carbons in the branched alkyl is that x is limited by steric hindrance between the aforesaid R' and R" groups. Desirably, R" is selected from the group consisting of isopropyl (i-propyl), tert-butyl (t-butyl), isobutyl (i-butyl), sec-butyl (s-butyl), tert-amyl (t-amyl), isoamyl (i-amyl), and neoamyl. The amyl compound may be any acyclic amyl. The term "amyl" refers to $C_5H_{11}$ group known to be present in several isomer forms. Preferably, the carbonate of the invention is of the formula R'OCOOR" where R' is a methyl group and R" is a branched hydrocarbon having 3 to 7 carbons. A preferred unsymmetric carbonate has a methyl group (R') and isopropyl group (R"), namely, methyl isopropyl carbonate.

In the case where one or more additional organic solvents is used in the solvent mixture along with the R'OCOOR", the added solvents are preferably organic solvents having a boiling point of about 80° C. to about 300° C. and are capable of forming a solute with lithium salts. Preferred additional organic solvents are ethylene carbonate (EC) and dimethyl carbonate (DMC). The relative amounts of the added solvents and the R'OCOOR" compound may vary so long as the solvent compound of the invention is present. Among the new class of solvents identified by the present invention, there is preferred methyl isopropyl carbonate (MIPC). Other preferred selections included methyl tert-butyl (t-butyl) carbonate and methyl tert-amyl (t-amyl) carbonate.

Except for the present invention, there is not known to be use of a carbonate-based electrolyte solvent of the formula R'OCOOR" where at least one of R' and R" is a non-linear, branched alkyl. Further, there is not known to be use of a carbonate-based electrolyte solvent which is unsymmetric, having R' and R" different from one another, and where R' is a linear alkyl and R" is an acyclic, non-linear, branched alkyl.

The present invention provides an electrochemical cell or battery which has virtually no gassing or a very low rate of gassing as compared to conventional cells and batteries using conventional electrolyte solvents. Advantageously, the solvent of the present invention exhibits good performance even with carbonaceous electrode active materials and with transitional metal electrode active materials which show poor performance when used with conventional organic solvents.

Objects, features, and advantages of the invention include an improved electrochemical cell or battery having improved charging and discharging characteristics; a large discharge capacity; and which maintains its integrity over a prolonged life cycle as compared to presently used batteries and cells. Another object is to provide an electrolyte mixture which is stable with respect to carbonaceous and graphitic electrode active material and stable with respect to metal oxide electrode material, and which demonstrates high performance, and which does not readily decompose, evaporate, or solidify. It is also an object of the present invention to provide cells which can be manufactured more economically and conveniently, and to provide cells with electrolyte solvents compatible with other components of a cell, avoiding problems with undesired reactivity and gas formation.

These and other objects, features, and advantages will become apparent from the following description of the preferred embodiments, claims, and accompanying drawings.

BRIEF DESCRIPTION OF THE DRAWINGS

FIG. 3 is a two part graph showing the results of testing a cell, rocking chair battery, having an anode comprising BG-35 active material cycled with a counter-electrode comprising lithium manganese oxide active material. The cell charge and discharge are at ±1 milliamp hour per centimeter square, between 3 and 4.2 volts for 1 to 165 cycles. The negative electrode contained 580 milligrams of the BG-35 active material and the positive electrode contained 1680 milligrams of the lithium manganese oxide active material. The surface area of the positive electrode was 48 square centimeters and the surface area of the negative electrode was 48 square centimeters. The electrolyte comprises 10 percent MIPC in 1 molar $LiPF_6$ EC/DMC. The weight ratio of EC/DMC is 2:1. The overall weight ratio of EC/DMC/MIPC was 6:3:1.

DETAILED DESCRIPTION OF THE PREFERRED EMBODIMENTS

Figure 1:
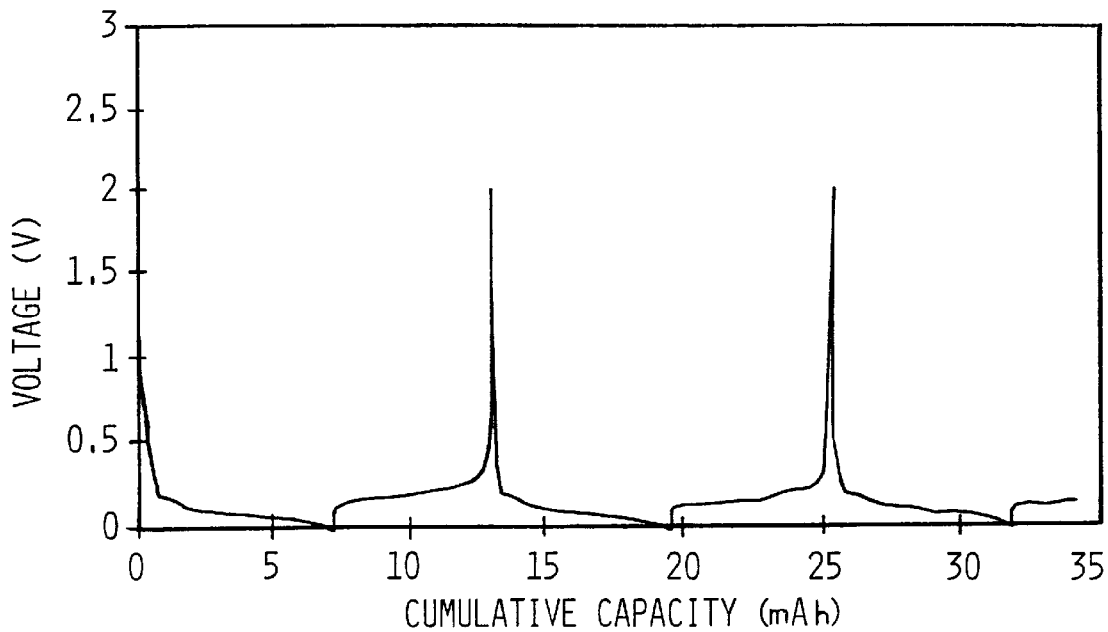
FIG. 1 is a voltage/capacity plot, showing cumulative capacity (mAh), for BG-35 graphite carbon electrode cycled with a lithium metal counter-electrode using constant current cycling at ±0.2 milliamps per square centimeter, between 0.01 and 2.0 volts, using 19.6 milligrams of the BG-35 active material. The electrolyte is 1 molar $LiPF_6$ in a solution of ethylene carbonate (EC) and methyl isopropyl carbonate (MIPC). The weight ratio of EC:MIPC is 3:7.

The invention provides, for the first time, an electrolyte stabilized against decomposition during cyclic operation of an electrochemical cell. The electrolyte includes a specifically selected class of new solvents which are resistant to decomposition and resultant gas formation. Such decomposition and gas formation are problems encountered with the conventional electrolytes used today. Before describing the invention, it is useful to understand problems associated with present electrolytes.

Electrolyte decomposition will occur with any solvent at high enough potential. In the case of lithium cells, the solvents are organic, aprotic, polar solvents. The extent of decomposition of solvents will occur at different rates and at different potentials. In the case of conventional exemplary carbonates, the solvent may be a cyclic carbonate or linear carbonate, yet the same decomposition mechanism applies at different rates. Exemplary organic solvents are γ-butyrylactone, tetrahydrofuran, propylene carbonate, vinylene carbonate, ethylene carbonate, dimethyl carbonate (DMC), diethyl carbonate (DEC), butylene carbonate, methyl ethyl carbonate, dipropyl carbonate, dibutyl carbonate, diethoxy ethane, ethyl methyl carbonate, dimethoxyethane, and dioxolane. It has been found that if a graphite negative electrode is used in an electrolyte containing various carbonates as the solvent, the solvent is apparently absorbed into the active sites of the graphite negative electrode and readily generates gas through decomposition. As a result, the decomposition of the solvent prevents lithium ion as an active material from intercalating into the graphite on charging the battery and causes an increase in polarization; consequently, the battery capacity is decreased. In other words, it is thought that the graphite is catalytic and causes breakdown of propylene carbonate. Such decomposition of the carbonates, such as DMC, DEC, and EC results in the evolution of the gas, probably methane, ethylene, and/or ethane.

In view of the difficulties mentioned above, electrolytes, such as propylene carbonate are generally usable only with non-graphitic anodes and is not usable with crystalline, ordered, planar structure graphite anodes which are preferred today. It has recently been suggested to use dimethyl carbonate (DMC) in combination with ethylene carbonate (EC) for any type of carbonaceous anode. See for example, U.S. Pat. Nos. 5,352,548 and 5,192,629, each of which is incorporated by reference in its entirety. However, such electrolyte is undesirable since DMC readily evaporates leaving behind EC which quickly solidifies, rendering the cell useless. Commonly owned application Ser. No. 08/553,882 described a highly crystalline graphite material sold under the designation SFG-15 that works better than any other commonly known graphites, with the solvent consisting of ethylene carbonate and dimethyl carbonate (EC/DMC). This solvent demonstrated good capacity and relatively low capacity loss as compared to conventional solvents containing propylene carbonate. Commonly owned application Ser. No. 08/630,402 described carbons having specific characteristics which led to very low first cycle capacity loss when used in combination with a mixed solvent comprising propylene carbonate (PC), ethylene carbonate (EC), and optionally one or more other organic solvents having a boiling point less than the boiling point of ethylene carbonate (EC). It is evident that EC/DMC is successfully used with a specific type of graphite. The EC/PC combination has advantages, when used in a given temperature range. It is observed that gassing is a common problem with solvent mixtures containing EC/DMC. A break down mechanism will now be described for a commonly used organic solvent EC/DMC. It appears that such break down occurs in a solvent when the alkyl group is connected through an oxygen to the main chain of the compound. It is thought that the alkyl group is cleaved during decomposition of the electrolyte solvent. As stated earlier, the extent of decomposition reaction depends on the state of charge of the cell, and the reaction rate is greater at higher state of charge, that is, higher voltage. The rate of gas formation is greater at higher state of charge.

It is also thought that decomposition of the electrolyte is affected by a decomposition mechanism involving the positive electrode active material. It has been observed that evolution of a considerable quantity of gaseous species occurs concurrent with manganese dissolution from lithium manganese oxide (LMO) active material which affects the capacity of a cell. The formation of gaseous material appears to be related to reactions which occur to the same extent as decomposition of the LMO, suggesting that the LMO break down provides catalytic effect which causes generation of decomposition products from the electrolyte solvent, forming any of the variety of gases, such as carbon monoxide, carbon dioxide, and methane. Methane may further decompose to form hydrogen gas.

The electrolyte of the invention comprises a solvent or solvent mixture containing the novel solvent compound of the invention. Such solvent compounds are resistant to decomposition and by-product gas formed by decomposition.

The solvents of the invention are generally characterized as non-linear carbonates with lower melting points and higher boiling points compared to the range observed for commonly used solvent, such as dimethyl carbonate (DMC). The DMC is merely a linear, non-branched carbonate. It does not have high boiling point and is not suitable for high temperature operation. It is not suitable for low temperature operation due to its high melting point. The non-linear carbonates of the invention have further lower melting point and higher boiling point useful as both high and low temperature solvents. Therefore, the advantages of temperature spread between the melting point and the boiling point is achieved by the carbonates of the invention by employing a preferred methyl group and a non-linear alkyl group which results in achieving advantages of broad temperature spread without significantly raising the viscosity.

The compounds usable as solvents according to the invention are carbonates of the general formula R'OCOOR" where at least one of said R' and R" is a non-linear, branched alkyl group. R' and R" may be different or the same, but are preferably different from one another. When R' and R" are different from one another, the carbonate is an unsymmetric, acyclic, non-linear, branched carbonate. It is preferred that the carbonate of the general formula R'OCOOR" have R' selected from the group of n-alkyl having 1 to 2 carbons; and R" is a branched alkyl having 3 to 7 carbons, and preferably 3 to 5 carbons. It is preferred that R' has at least 1 carbon and no more carbons than R". It is preferred that R" has at least 3 carbons and up to x number of carbons where x is selected to provide a viscosity of less than 0.90 cp at 25° C. A further limitation to the upper limit of carbons in the branched alkyl is that x is limited by steric hindrance between the aforesaid R' and R" groups. Desirably, R" is selected from the group consisting of isopropyl (i-propyl), tert-butyl (t-butyl), isobutyl (i-butyl), sec-butyl (s-butyl), tert-amyl (t-amyl), isoamyl (i-amyl), and neoamyl. The amyl compound may be any acyclic amyl. The term "amyl" refers to $C_5H_{11}$ group known to be present in several isomer forms. Preferably, the carbonate of the invention is of the formula R'OCOOR" where R' is a methyl group and R" has 3 to 5 carbons. A preferred unsymmetric carbonate has a methyl group (R') and isopropyl group (R"), namely, methyl isopropyl carbonate. Examples are given in Tables I and II.

The R" group may itself contain a substituent, therefore, R" is a non-linear alkyl or derivative thereof. The derivatives are formed by substitution which is selected to maintain a solidifying point (melting point) lower than that of dimethyl carbonate (DMC). That is, lower than about 5° C. Such derivatives are also characterized by resistance to decomposition, as compared to DMC. Other derivatives may be formed by replacing a hydrogen with a substituent, in the alkyl hydrocarbon.

The carbonate compound of the invention may be used as a sole solvent or may be included in a solvent mixture. Such solvent mixture preferably includes one or more other organic solvents having a boiling point of about 80° C. to about 300° C. and where such other solvent is capable of forming a solute with lithium salts. Such one or more other organic solvents is selected from the group consisting of ethylene carbonate (EC), dimethyl carbonate (DMC), diethyl carbonate (DEC), dipropyl carbonate (DPC), dibutyl carbonate (DBC), diethoxy ethane (DEE), ethyl methyl carbonate (EMC), butylene carbonate (BC), γ-butyrolactone, tetrahydrofuran, propylene carbonate, vinylene carbonate, methyl ethyl carbonate, dimethoxyethane, and dioxolane, and mixtures thereof. Table III contains structures of common carbonate solvents usable as co-solvents. Even a small amount of the carbonate compound solvent of the invention is helpful to the mixture, therefore, the lower limit is greater than 0. A practical range by weight is 1:9 to 9:1 carbonate compound solvent to other organic solvents.

In the case where one or more additional organic solvents is used in the solvent mixture along with the R'OCOOR", the added solvents are preferably selected from EC, DMC, DEC, and mixtures thereof. The relative amounts of the added solvents and the R'OCOOR" compound may vary so long as the solvent compound of the invention is present. Among the new class of solvents identified by the present invention, there is preferred methyl isopropyl carbonate (MIPC) where R' is methyl and R" is isopropyl. Other preferred selections include methyl, tert-butyl carbonate (t-butyl); and methyl, tert-amyl carbonate (t-amyl).

The invention will further be described with reference to the exemplary methyl isopropyl carbonate (MIPC) which has the following characteristics. The MIPC is a colorless liquid, has a viscosity of approximately 0.72 cp (centipoise) at 26° C., and a density of 0.995 grams per cubic centimeter.

(Refer to Table IV.) It has an attractive solution conductivity <10$^{-7}$ siemens per centimeter. It is prepared by an exemplary process described further below, preferably achieving high purity by gas chromatograph of 99.5 percent and a moisture content less than 50 ppm. Its melting point is −57° C. and the boiling point of MIPC is 115° C. The structural formula of methyl isopropyl carbonate is shown below along with an exemplary preparation method.

The exemplary method forms the preferred unsymmetric carbonate of the invention having a non-linear, branched alkyl group, where R' is methyl and R" is a branched alkyl group, preferably with 3 to 5 carbon atoms. The general method shown is an exemplary reaction based on an alkyl haloformate and an organic alcohol. The reaction may be conducted at elevated temperature (50° C. to 80° C.) or at low temperature in the presence of an organic base, such as an amine or pyridine. Alternatively the reaction amy be conducted using an inorganic base. Starting with methyl chloroformate, and isopropyl alcohol, MIPC can be made. As shown, the alkyl haloformate is methyl chloroformate. The chlorine leaving group is replaced by the R" group of the isopropyl alcohol forming the exemplary MIPC unsymmetric, branched carbonate of the invention.

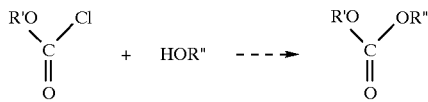

Where R' is methyl and R" is isopropyl alcohol, methyl, isopropyl carbonate is formed (MIPC).

MIPC:

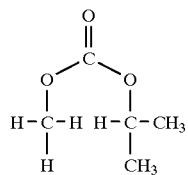

Other preparation processes are described in U.S. Pat. Nos. 5,206,408 (Liotta); 5,206,409 (Romano et al); 5,534,649 (Cho et al); and 5,563,288 (Bastron) each of which is incorporated herein by reference in its entirety. U.S. Pat. No. 5,206,408 describes a method to convert symmetric dialkyl carbonate, such as DMC, to an unsymmetric linear dialkyl carbonate by reacting the linear symmetric dialkyl carbonate with an alcohol selected from the group of alcohols containing the substituent for which substitution is desired. An example is methyl, butyl carbonate, made by substituting one of the methyl groups in the starting dialkyl, dimethyl carbonate. U.S. Pat. No. 5,206,409 describes a method to prepare a symmetric linear dialkyl carbonate, such as dimethyl carbonate. This dimethyl carbonate forms the precursor for the process of forming unsymmetric dialkyl carbonate as described in U.S. Pat. No. 5,206,408. U.S. Pat. No. 5,534,649 also describes a method for preparing symmetric dialkyl carbonates. The examples given are formation of dimethyl carbonate and diethyl carbonate by reaction of urea, methyl carbamate, ethyl carbamate with methanol and/or ethanol in the presence of a catalyst. U.S. Pat. No. 5,563,288 shows a method of making MIPC for use as an intermediate in forming di-(tertiary amino alkyl) carbonate. This is done by (i) reacting dimethyl carbonate with isopropyl alcohol in the presence of an alkali metal catalyst in cyclohexane to form a methyl isopropyl carbonate, and (ii) reacting a tertiary alkanolamine with the methyl isopropyl carbonate formed in step (i) to form di-(tertiary aminoalkyl) carbonate.

Referring to Table V there can be seen characteristics of comparative organic solvents. The methyl isopropyl carbonate of the invention has a boiling point higher than dimethyl carbonate and a melting point more than 50° lower than dimethyl carbonate. Clearly, the substitution of one of the methyl groups with a non-linear, branched, alkyl group achieves a very broad spread between the boiling point and the melting point providing a very advantageous wide range of operation where the solvent remains liquid. In the case of dimethyl carbonate, the boiling point is 91° C. and the melting point is about 4.6° C. This is a difference of approximately 86° C. In the case of methyl isopropyl carbonate, the boiling point is approximately 115° C. and the melting point is −57° C. This results in a difference of 172°, nearly double the operating range for DMC. The very low solidification point (melting point) of methyl isopropyl carbonate is clearly advantageous when compared to that of DMC.

The MIPC may be used successfully in combination with one or more of the exemplary solvents shown in the Tables and Figures. The carbonates of the invention may be used in a two component solvent mixture, a three component solvent mixture, or any combination desired. It is preferred that in a solvent mixture, the other organic solvents have a boiling point of 80° C. to 300° C. Alkyl carbonates are preferred. The other solvents must further meet the criteria that they dissolve inorganic lithium salts, such as LiPF$_6$. They must also have good (high) dielectric constant as exemplified by the range of values in the Tables and Figures.

Except for the present invention, there is not known to be use of a carbonate-based electrolyte solvent of the formula R'OCOOR" where at least one of R' and R" is a non-linear, branched alkyl. The present invention provides an electrochemical cell or battery which has a very low rate of gassing as compared to conventional cells and batteries using conventional electrolyte solvents. The solvent of the present invention exhibits good performance even with graphite electrode materials, such as BG-35. This graphite, BG-35, was a very poor performer when used with EC/PC. The new solvents, when used as co-solvents, stabilize other solvents in the solvent mixture.

Figure 2:
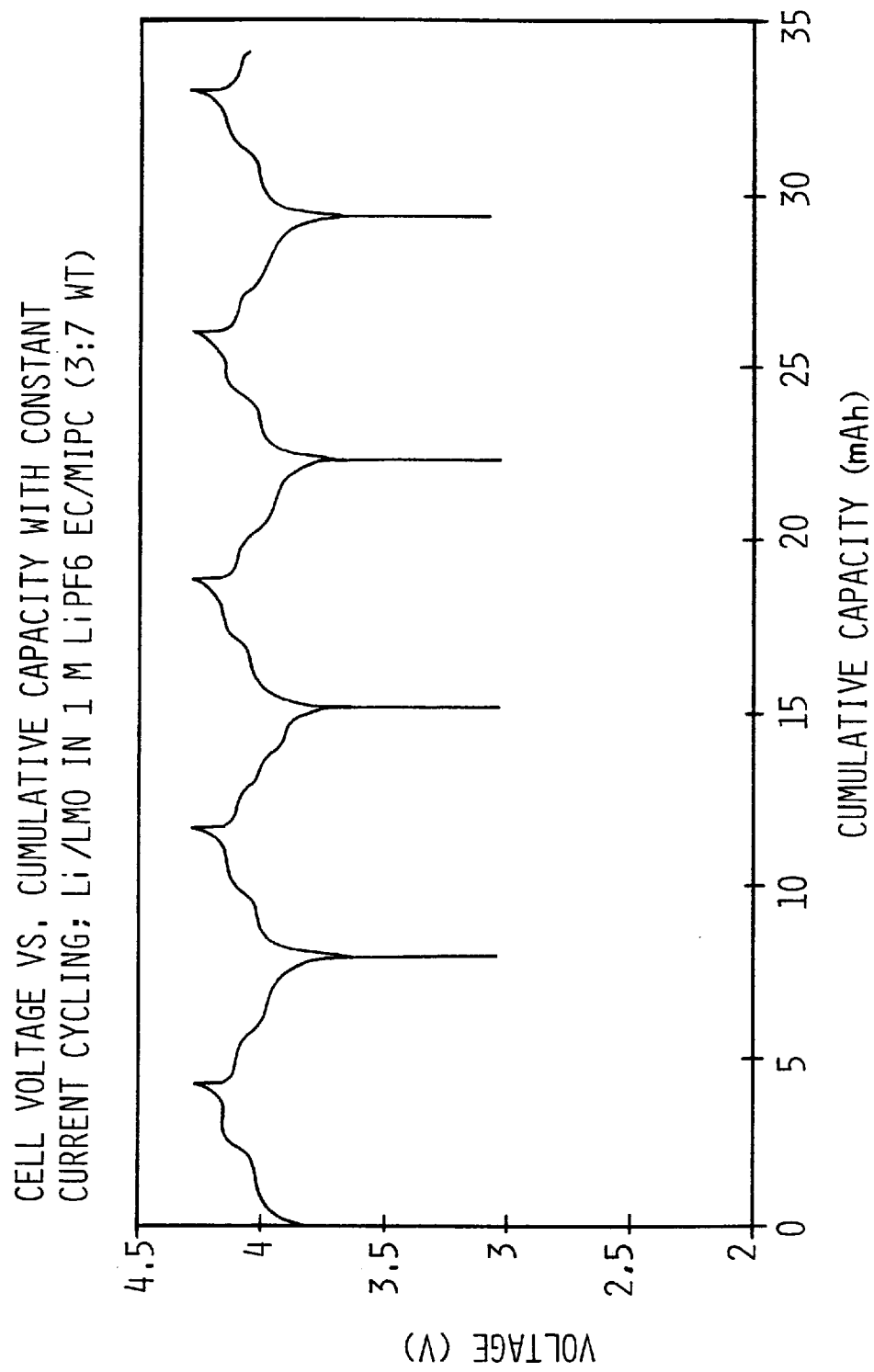
FIG. 2 is a voltage/capacity plot showing cumulative capacity (mAh) for lithium manganese oxide (LMO) electrode cycled with a lithium metal counter-electrode using constant current cycling at ±0.2 milliamps per square centimeter, between 3.0 and 4.3 volts, using 30.7 milligrams of the LMO active material. The electrolyte is 1 molar $LiPF_6$ in a solution of ethylene carbonate (EC) and methyl isopropyl carbonate (MIPC). The weight ratio of EC:MIPC is 3:7.

Graphite and lithium metal oxide electrode active materials were prepared and tested in electrochemical cells along with the novel electrolyte solvent and the results are as reported in FIGS. 1 to 3. A typical cell configuration will be described with reference to FIG. 4.

Figure 4:
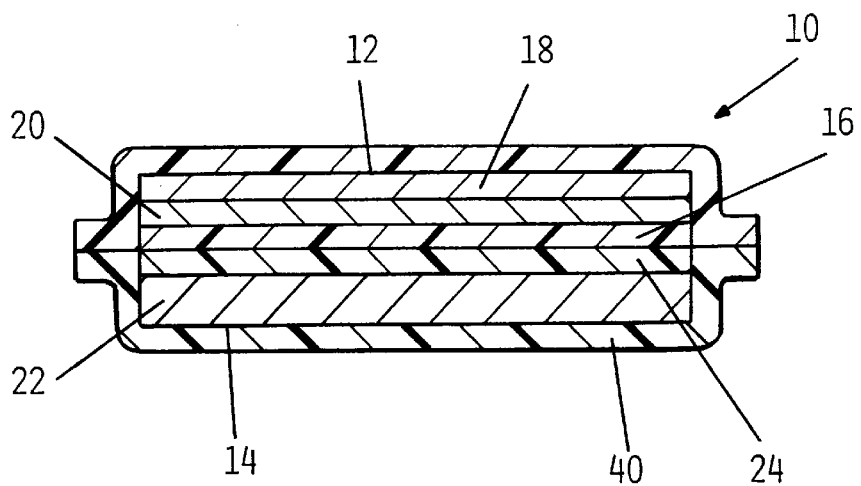
FIG. 4 is an illustration of a cross section of a thin battery or cell embodying the invention.

The electrochemical cell or battery which uses the novel electrolyte solvent of the invention will now be described, with reference to FIG. 4. By convention, an electrochemical cell comprises a first electrode, a counter-electrode which reacts electrochemically with the first electrode, and an electrolyte which is capable of transferring ions between the electrodes. A battery refers to one or more electrochemical cells. Referring to FIG. 4, an electrochemical cell or battery 10 has a negative electrode side 12, a positive electrode side 14, and an electrolyte/separator 16 therebetween. The negative electrode is the anode during discharge, and the positive electrode is the cathode during discharge. The negative electrode side includes current collector 18, typically of nickel, iron, stainless steel, and copper foil, and negative electrode active material 20. The positive electrode side includes current collector 22, typically of aluminum, nickel, and stainless steel, and such foils may have a protective conducting coating foil, and a positive electrode active material 24. The electrolyte/separator 16 is typically a solid electrolyte, or separator and liquid electrolyte. Solid electrolytes are typically referred to as polymeric matrixes which contain an ionic conductive medium. Liquid electrolytes typically comprise a solvent and an alkali metal salt which form an ionically conducting liquid. In this latter case, the separation between the anode and cathode is maintained, for example, by a relatively inert layer of material such as glass fiber. The electrolyte is not an essential feature of the invention. Essentially, any lithium ion containing conducting electrolyte may be used, that is stable up to 4.5 volts or more. Essentially any method may be used to maintain the positive and negative electrodes spaced apart and electrically insulated from one another in the cell. Accordingly, the essential features of the cell are the positive electrode, a negative electrode electrically insulated from the positive electrode, and an ionically conducting medium between the positive and negative electrodes. Examples of a suitable separator/electrolyte, solvents, and salts are described in U.S. Pat. No. 4,830,939 showing a solid matrix containing an ionically conducting liquid with an alkali metal salt where the liquid is an aprotic polar solvent; and U.S. Pat. Nos. 4,935,317; 4,990,413; 4,792,504; 5,037,712; 5,418,091; 5,456,000; 5,460,904; 5,463,179; and 5,482,795. Each of the above patents is incorporated herein by reference in its entirety. Protective bagging material 40 covers the cell and prevents infiltration of air and moisture.

Electrodes of the invention are made by mixing a binder, the active material, and carbon powder (particles of carbon). The binder desirably is a polymer. A paste containing the binder, active material, and carbon is coated onto a current collector. The positive electrode comprises the lithium manganese oxide active material of the invention. For the positive electrode, the content is typically as follows: 50 to 90 percent by weight active material; 5 to 30 percent carbon black as the electric conductive diluent; and 3 to 20 percent binder, preferably chosen to enhance ionic conductivity. Stated ranges are not critical. The amount of active material may range from 25 to 85 weight percent. These materials are mixed and blended together with a solvent. Xylene is a suitable solvent. The mixture is then coated onto a current collector to achieve the desired thickness for the final electrode. The negative electrode of the invention preferably comprises about 80 to about 95 percent by weight of the specific graphite, and more preferably about 95 percent by weight, with the balance constituted by the binder. Preferably, the anode is prepared from a graphite slurry using polyvinylidene difluoride (PVDF) in a solvent along with the carbon particles. The slurry is coated onto a current collector using conventional application techniques.

The electrolyte used to form a completed cell comprises the R'OCOOR" compound of the invention. It may additionally comprise any of a number of added solvents, such as ethylene carbonate (EC), dimethyl carbonate (DMC), and mixtures thereof. The solvent contains typically a 1 molar solution of a lithium metal salt, such as $LiPF_6$. The positive and negative electrodes are maintained in a separated, spaced apart condition using a fiberglass layer or separator of an equivalent design.

The electrochemical cell which utilizes the novel solvent of the invention may be prepared in a variety of ways. In one embodiment, the negative electrode may be metallic lithium. In more desirable embodiments, the negative electrode is an intercalation active material, such as, metal oxides and graphite. When a metal oxide active material is used, the components of the electrode are the metal oxide, electrically conductive carbon, and binder, in proportions similar to that described above for the positive electrode. In a preferred embodiment, the negative electrode active material is graphite particles. For test purposes, test cells were fabricated using lithium metal electrodes. When forming cells for use as batteries, it is preferred to use an intercalation metal oxide positive electrode and a graphitic carbon negative electrode.

Various methods for fabricating electrochemical cells and batteries and for forming electrode components are further described immediately below. The invention is not, however, limited by any particular fabrication method as the novelty lies in the unique electrolyte. Accordingly, additional methods for preparing electrochemical cells and batteries may be selected and are described in the art, for example, in U.S. Pat. Nos. 5,435,054 (Tonder & Shackle); 5,300,373 (Shackle); 5,262,253 (Golovin); 4,668,595; 4,830,939 (Lee & Shackle); and particularly 5,418,091; 5,456,000; and 5,460,904 assigned to Bell Comm. Research. Each of the above patents is incorporated herein by reference in its entirety.

EXAMPLE I

A graphite electrode was fabricated by solvent casting a slurry of BG-35 graphite, binder, plasticizer, and casting solvent. The graphite, BG-35, was supplied by Superior Graphite, Chicago, Ill. The BG series is a high purity graphite derived from a flaked natural graphite purified by heat treatment process. The physical features are given in Table VI. The binder and plasticizer were Kynar Flex 2801® (88:12 copolymer of polyvinylidene difluoride (PVDF) and hexafloropropylene (HFP)) was used as the binder, a plasticizer and an electronic grade solvent were used. The slurry was cast onto glass and a free standing electrode was formed as the casting solvent evaporated. The slurry composition was as follows:

| Component | Wet Weight % | Dry Weight % |
|---|---|---|
| Graphite | 24.3 | 58.3 |
| Binder | 6.8 | 16.4 |
| Plasticizer | 10.5 | 25.3 |
| Solvent | 58.4 | — |
| Total | 100.0 | 100.0 |

The counter-electrode was lithium metal. A glass fiber separator was used between the electrodes to prevent them from electrically shorting. An electrochemical cell of the first electrode, separator, and counter-electrode was formed.

The electrolyte used to form the completed final cell or battery comprised a solution of ethylene carbonate and methyl isopropyl carbonate at a weight ratio of 3:7 with 1 molar $LiPF_6$ salt. The two electrodes were maintained in separated condition using a fiber glass layer. The electrolyte solution interpenetrated the void spaces of the fiber glass layer. The results of constant current cycling are shown in FIG. 1. FIG. 1 shows a voltage/capacity plot of BG-35 graphite cycled with a lithium metal electrode using constant current cycling at ±0.2 milliamps per square centimeter, between 0.01 and 2.0 volts versus $Li/Li^+$, using 19.6 milligrams of the BG-35 active material. The electrolyte is 1 molar $LiPF_6$ in a solution of 3:7 by weight ethylene carbonate (EC) and methyl isopropyl carbonate (MIPC). In the first half cycle, lithium is removed from the metallic electrode and intercalated into the graphite electrode. When essentially full intercalation at the graphite electrode is complete, corresponding to about $Li_1C_6$, the voltage has dropped to approximately 0.01 volts, representing about 378 milliamp hours per gram, corresponding to about 7.4 milliamp hours based on 19.6 milligrams of active material. In the second half cycle, the lithium is deintercalated from the graphite and returned to the metallic electrode until the average voltage is approximately 2 volts versus Li/Li$^+$. The deintercalation corresponds to approximately 294 milliamp hours per gram, representing approximately 5.8 milliamp hours based on 19.6 milligrams of active material. This completes an initial cycle. The percentage difference between the 378 milliamp hours per gram capacity "in", and the 294 milliamp hours per gram capacity "out", divided by the initial 378 capacity "in", corresponds to a surprisingly low 22 percent loss. In the rest of FIG. 1, the cycling is repeated, maintaining high capacity.

EXAMPLE II

An electrode cathode was fabricated by solvent casting a slurry of lithium manganese oxide, conductive carbon, binder, plasticizer, and solvent. The lithium manganese oxide used was LiMn$_2$O$_4$ supplied by Kerr-McGee (Soda Springs, Id.); the conductive carbon used was Super P (MMM carbon), Kynar Flex 2801® was used as the binder along with a plasticizer, and electronic grade acetone was used as the solvent. The slurry was cast onto aluminum foil coated with polyacrylic acid/conductive carbon mixture. The slurry was cast onto glass and a free standing electrode was formed as the solvent was evaporated. The cathode slurry composition was as follows:

| Component | Wet Weight % | Dry Weight % |
|---|---|---|
| LiMn$_2$O$_4$ | 28.9 | 65.0 |
| Graphite | 2.5 | 5.5 |
| Binder | 4.5 | 10.0 |
| Plasticizer | 8.7 | 19.5 |
| Solvent | 55.4 | — |
| Total | 100.0 | 100.0 |

The cell was prepared as noted above. The electrochemical cell was prepared as noted above with respect to Example I. The electrolyte was prepared having the same composition as the electrolyte of Example I.

FIG. 2 contains the results of constant current cycling and is a graph of cell voltage versus capacity. FIG. 2 shows a voltage/capacity plot of lithium manganese oxide (nominally LiMn$_2$O$_4$, LMO) cycled with a lithium metal electrode using constant current cycling at ±0.2 milliamps per square centimeter, between about 3 and 4.3 volts versus Li/Li$^+$, using 30.7 milligrams of the LMO active material. The electrolyte is 1 molar LiPF$_6$ in a solution of 3:7 by weight ethylene carbonate and methyl isopropyl carbonate (MIPC).

In an as-assembled, initial condition, the positive electrode active material is nominal LiMn$_2$O$_4$. The lithium is deintercalated from LMO during charging of the cell. When fully charged, optimally about 0.8 unit of lithium has been removed per formula unit of the original LiMn$_2$O$_4$. In this fully charged condition, the electrochemical potential versus lithium of the LMO, is about 4.3 volts. The deintercalation of lithium from LMO results in approximately 137 milliamp hours per gram corresponding to 4.2 milliamp hours. Next, the cell is discharged whereupon a quantity of lithium is reintercalated into the LMO. The reintercalation corresponds to approximately 117 milliamp hours per gram or 3.6 milliamp hours, and the bottom of the curve corresponds to approximately 3 volts. The cell is then subsequently recharged whereupon a quantity of lithium ions is again deintercalated, returning to the region of approximately 4 volts. Charging and discharging continued successfully over a number of additional cycles. As can be seen from FIG. 2, the first cycle loss corresponded to only 14 percent, which is very good.

EXAMPLE III

In this example, a rocking chair battery was prepared comprising a graphite anode, an intercalation compound cathode, and a novel electrolyte comprising the MIPC of the invention. The negative electrode comprising BG-35 was prepared as described in Example I. The lithium manganese oxide positive electrode was prepared in accordance with the description given in Example II. A first solvent solution of 1 molar LiPF$_6$ in EC/DMC (2:1 by weight) was prepared. Then, 90 percent by weight of this first solvent solution was mixed with 10 percent by weight of MIPC, to form a solvent mixture for the test cell. (EC/DMC/MIPC at 6:3:1 weight ratio.)

FIG. 3 is a two part graph. FIG. 3A shows the excellent rechargeability and FIG. 3B shows the excellent cyclability and capacity of the cell prepared in accordance with Example III. The capacity was determined at constant current cycling for cycles 1 to 165 consistent with the test parameters described above. FIG. 3 shows long cycle life demonstrated by the relatively slow capacity fade with cycle numbers. The recharge ratio data shows the absence of any appreciable side reactions and decompositions over the extended life cycling. This can be more particularly seen from FIG. 3A. The recharge ratio maintains its value exceptionally close to 1. The cell maintains over 80 percent of its capacity of over extended cycling to 165 cycles. The combination of slow, minimal capacity fade along with excellent recharge ratio demonstrates the absence of any appreciable side reactions. This is evidence that electrolyte break down is not occurring. Further evidence of lack of electrolyte break down is the fact that the cell does not expand in volume and puff up. This shows absence of gas formation caused by electrolyte break down. Absence of such gassing, absence of electrolyte break down, and absence of irreversible charge consumption demonstrates the unique and unexpected advantage of the electrolyte solvent of the invention. As per Examples I and II, the use of MIPC as a co-solvent stabilizes the solvent mixture against break down.

Comparative Examples

For comparison purposes, an additional cell was prepared in accordance with the methods of Example I, except that the solvent was 50:50 by weight EC/PC with 1 molar LiPF$_6$. This electrolyte comprising ethylene carbonate and propylene carbonate solvent was tested in a cell having a lithium metal electrode and a BG-35 counter-electrode. The active mass was 11.5 milligrams. The reversible specific capacity was found to be 0 and the first cycle capacity loss was 100 percent. This result is quite remarkable since the BG-35 graphite performed so well in Examples I and III and performed so poorly in the comparative example. This shows the striking and heretofore unexpected sensitivity of the electrolyte solvent composition in relation to cell performance. In addition, performance was compared to a cell having the conventional 2:1 weight ratio EC/DMC solvent. The electrochemical performance of the 2:1 EC/DMC solvent and the 6:3:1 EC/DMC/MIPC were generally comparable. However, the MIPC used in combination with EC and DMC apparently stabilized the EC and DMC against break down. The EC/DMC solvent break down was evidenced by expansion of the cell container caused by gaseous decomposition products. This did not occur in the cell having EC/DMC/MICP. Therefore, the MIPC has the added benefit of stabilizing the co-solvents against break down decomposition. The mechanism is not fully understood. However, it is thought that the new solvents of the invention build up a passive layer on the electrode, particularly carbon graphite electrode material.

TABLE I

$C_3$: propyl isopropyl (i-propyl)

$$\text{CH}_3-\overset{\displaystyle |}{\underset{\displaystyle \text{CH}_3}{\text{CH}}}-$$

$C_4$: butyl isobutyl (i-butyl)

$$\text{CH}_3-\overset{\displaystyle |}{\underset{\displaystyle \text{CH}_3}{\text{CH}}}-\text{CH}_2-$$

sec-butyl (s-butyl)

$$\text{CH}_3-\text{CH}_2-\overset{\displaystyle |}{\underset{\displaystyle \text{CH}_3}{\text{CH}}}-$$

tert-butyl (t-butyl)

$$\text{CH}_3-\overset{\displaystyle \text{CH}_3}{\underset{\displaystyle \text{CH}_3}{\overset{\displaystyle |}{\underset{\displaystyle |}{\text{C}}}}}-$$

$C_5$: amyl (pentyl)

n-amyl    —$CH_2CH_2CH_2CH_2CH_3$ i-amyl    —$CH_2CH_2CHCH_3$
                      |
                      $CH_3$ t-amyl $$-\overset{\displaystyle \text{CH}_3}{\underset{\displaystyle \text{CH}_3}{\overset{\displaystyle |}{\underset{\displaystyle |}{\text{C}}}}}-\text{CH}_2\text{CH}_3$$

neopentyl $$-\text{CH}_2-\overset{\displaystyle \text{CH}_3}{\underset{\displaystyle \text{CH}_3}{\overset{\displaystyle |}{\underset{\displaystyle |}{\text{C}}}}}-\text{CH}_3$$

Other pentyls:

2-methyl butyl    —$CH_2CHCH_2CH_3$
                              |
                              $CH_3$ 1-methyl butyl    —$CHCH_2CH_2CH_3$
                              |
                              $CH_3$

TABLE I-continued 1-ethyl propyl    —$CHCH_2CH_3$
                              |
                              $CH_2$
                              |
                              $CH_3$

TABLE II $$H_3CO\diagdown\underset{\displaystyle \underset{\displaystyle O}{\|}}{C}\diagup OR$$

| R = $CH(CH_3)_2$ | i-propyl |
| R = $C(CH_3)_3$ | t-butyl |
| R = $CH_2CH_2CH(CH_3)_2$ | i-amyl |
| R = $C(CH_3)_2CH_2CH_3$ | t-amyl |

TABLE III

EC:

$$\underset{\displaystyle \text{CH}_2-\text{CH}_2}{\overset{\displaystyle \overset{\displaystyle O}{\|}}{\underset{\displaystyle O\diagup\ \diagdown O}{C}}}$$

DMC:

$$\underset{\displaystyle \text{CH}_3\ \ \text{CH}_3}{\overset{\displaystyle \overset{\displaystyle O}{\|}}{\underset{\displaystyle O\diagup\ \diagdown O}{C}}}$$

DEC:

$$\underset{\displaystyle \underset{\displaystyle \text{CH}_3\ \ \text{CH}_3}{\text{CH}_2\ \ \text{CH}_2}}{\overset{\displaystyle \overset{\displaystyle O}{\|}}{\underset{\displaystyle O\diagup\ \diagdown O}{C}}}$$

TABLE IV

| Methyl Isopropyl Carbonate (MIPC) | |
| --- | --- |
| Physical: | Colorless liquid |
| Viscosity: | 0.72 cp at 26° C. |
| Density: | 0.995 g/cm³ |
| Solution Conductivity (S/cm) | <10⁻⁷ |
| Dielectric Constant at 20° C. | — |
| Moisture: | <50 ppm |
| Melting Point: | −57° C. |
| Boiling Point: | 115° C. |
| Purity by GC: | 99.5% (by area) |

TABLE V

Characteristics of Organic Solvents

|  | PC | VC | EC | DMC |
|---|---|---|---|---|
| Boiling Temperature (C.) | 240 | 162 | 248 | 91.0 |
| Melting Temperature (C.) | −49 | 22 | 39–40 | 4.6 |
| Density (g/cm$^3$) | 1.198 | 1.35 | 1.322 | 1.071 |
| Solution Conductivity (S/cm) | $2.1 \times 10^{-9}$ | — | $<10^{-7}$ | $<10^{-7}$ |
| Viscosity (cp) at 25° C. | 2.5 | — | 1.86 (at 40° C.) | 0.59 |
| Dielectric Constant at 20° C. | 64.4 | — | 89.6 (at 40° C.) | 3.12 |
| Molecular Weight | 102.0 | 86.047 | 88.1 | 90.08 |
| H$_2$O Content | <10 ppm | — | <10 ppm | <10 ppm |
| Electrolytic Conductivity (mS/cm) 20° C. 1M LiAsF$_6$ | 5.28 | — | 6.97 | 11.00 (1.9 mol) |

|  | DEC | BC | MEC | DPC |
|---|---|---|---|---|
| Boiling Temperature (C.) | 126 | 230 | 107 | 167–168 |
| Melting Temperature (C.) | −43 | — | −55 | — |
| Density (g/cm$^3$) | 0.98 | 1.139 | 1.007 | 0.944 |
| Solution Conductivity (S/cm) | $<10^{-7}$ | $<10^{-7}$ | $6 \times 10^{-9}$ | $<10^{-7}$ |
| Viscosity (cp) at 25° C. | 0.75 | 2.52 | 0.65 | — |
| Dielectric Constant at 20° C. | 2.82 | — | — | — |
| Molecular Weight | 118.13 | 116.12 | 104.10 | 146.19 |
| H$_2$O Content | <10 ppm | <10 ppm | <10 ppm | <10 ppm |
| Electrolytic Conductivity (mS/cm) 20° C. 1M LiAsF$_6$ | 5.00 (1.5 mol) | <3.7 | — | — |

TABLE VI

| Carbon Material | BG-35 |
|---|---|
| Surface Area (m$^2$/g) (BET) | 7 |
| Coherence Length L$_c$ (nm) | >1000 |
| Density (g/cm$^3$)[2] | 0.195 |
| Particle Size[1] | <36 |
| Median Size d$_{50}$ (μm) | 17 |
| Interlayer Distance c/2 (nm) | N/A |

[1]Maximum size for at least 90% by weight of graphite particles.
[2]In xylene.

In summary, the invention solves the problems associated with conventional electrolytes. Solvents containing DMC have always been a problem since DMC readily boils off. EC readily solidifies, and it is necessary for the cell to achieve a temperature of 40° C. to melt the EC and prevent it from solidifying. Although PC is a desirable solvent because it is liquid at very low temperatures, it interacts with carbon and deteriorates the carbon anode. In addition, mixtures of DMC/EC have been found to result in formation of gas. In contrast, solvents of the invention which comprise MIPC and similar unsymmetric carbonates having a linear group and a non-linear group provide highly desirable wide temperature operating range while avoiding decomposition of cell components evidenced by formation of gas. The formation of gas distorts the cell and in a worst case, may lead to cell rupture. It is thought that the solvent of the invention avoids problems associated with conventional solvents containing C—O—C bonds. The solvent of the present invention appears to stabilize the C—O—C bond avoiding cleavage. Therefore, the solvents of the invention are an improvement over conventional solvents containing C—O—C bonds where cleavage may occur at one or both of the bonds. The evolution of hydrogen gas by reduction at the anode is significantly reduced. This is in contrast to present solvents where the evolution of hydrogen gas significantly increases the volumetric size of the battery. It is thought that the solvents of the invention also avoid problems associated with decomposition of LMO and avoids the consequences of catalytic reaction which catalyzes decomposition of electrolyte solvent. The reduction of manganese Mn$^{3+}$ and/or Mn$^{4+}$ to Mn$^{2+}$ involves electron transfer mechanism. Where such electron transfer mechanism is possible, catalysis is also possible. It is thought that the decomposition of the LMO continuously forms ionic species dissolved in the electrolyte solution which provides an effective catalyst for reaction decomposition and cleaving of atomic bonds. Such decomposition was observed in the ethylene carbonate/dimethyl carbonate solvent mixture. In this case, the alkyl group is thought to be cleaved in the presence of decomposed LMO, which itself is thought to be caused by acid attack. Therefore, the reaction between the acid and the oxide causes decomposition of the electrolyte solvent. As stated earlier, the extent of decomposition reaction depends on the state of charge of the cell, and the reaction rate is greater at higher state of charge, that is, higher voltage. The rate of gassing is greater at higher state of charge. However, the corrosion of the LMO occurs regardless of the state of charge, leading to electrolyte break down. Yet, for the corrosion reaction, the greater the state of charge, the greater is the driving force for the corrosion reaction. Therefore, the stable electrolyte solvent of the invention provides a significant advantage since it avoids decomposition caused by a variety of mechanisms.

While this invention has been described in terms of certain embodiments thereof, it is not intended that it be limited to the above description, but rather only to the extent set forth in the following claims.

The embodiments of the invention in which an exclusive property or privilege is claimed are defined in the following claims:

We claim:

1. A lithium ion battery which comprises a first electrode having a carbonaceous active material; a counter-electrode which forms an electrochemical couple with said first electrode; and an electrolyte comprising a solvent and a solute; said solvent consisting of: one or more carbonates consisting of the elements carbon, hydrogen and oxygen; where at least one of said carbonates is represented by the formula R'OCOOR" where each of R' and R" represents an alkyl, and having at least one of said R' and R" selected from the group consisting of non-linear, branched alkyls where R' and R" are the same or different from one another.

2. The cell according to claim 1 wherein said carbonate is unsymmetric, R' is a linear n-alkyl having 1 to 2 carbons and R" is a branched alkyl having 3 to 7 carbons.

3. The cell according to claim 1 where R' has at least 1 carbon ($C_1$) and no more carbons than R", and where R" has at least 3 carbons ($C_3$) and up to $C_x$ where x is selected to provide a viscosity of less than 0.90 cp at 25° C.

4. The cell according to claim 1 wherein said carbonate is unsymmetric, R' is a methyl group and R" is $C_3$ to $C_5$.

5. The cell according to claim 4 wherein R" is selected from the group consisting of:
   a. i-propyl carbonate (—$CH(CH_3)_2$);
   b. i-butyl (—$CH_2CH(CH_3)_2$);
   c. t-butyl (—$C(CH_3)_3$);
   d. s-butyl (—CH ($CH_3$) $CH_2CH_3$);
   e. t-amyl (—$C(CH_3)_2CH_2CH_3$);
   f. i-amyl (—$CH_2CH_2CH(CH_3)_2$); and
   g. neopentyl (—$CH_2C(CH_3)_3$).

6. The cell according to claim 1 wherein said carbonate is methyl isopropyl carbonate.

7. The electrochemical cell according to claim 1 wherein said one or more carbonates includes a carbonate selected from the group consisting of ethylene carbonate (EC), dimethyl carbonate (DMC), diethyl carbonate (DEC), dipropyl carbonate (DPC), dibutyl carbonate (DBC), diethoxy ethane (DEE), ethyl methyl carbonate (EMC), butylene carbonate (BC), and mixtures thereof.

8. The electrochemical cell according to claim 1 wherein said solvent is a mixture consisting of said R'OCOOR" non-linear carbonate, and one or more other carbonate solvents having a boiling point of about 80° C. to about 300° C. and forming a solute with lithium salts.

9. The electrochemical cell according to claim 1 wherein said electrolyte further, comprises a separator in the form of a solid matrix forming a network with voids interpenetrated by said solvent mixture and said solute.

10. The electrochemical cell according to claim 9 wherein said matrix is selected from the group consisting of polymeric acrylate, porous polypropylene, porous polyethylene, and glass fiber material.

11. The electrochemical cell according to claim 1 wherein said counter-electrode comprises an intercalation active material.

12. The electrochemical cell according to claim 1 wherein said first electrode is a negative electrode and said counter electrode is a positive electrode comprising a lithium transition metal oxide compound.

13. The electrochemical cell according to claim 12 wherein said lithium transition metal oxide compound is lithium manganese oxide.

14. An electrochemical cell which comprises a first electrode; a counter-electrode which forms an electrochemical couple with said first electrode; and an electrolyte comprising a solvent and a solute; said solvent comprising: an unsymmetric dialkyl carbonate of the formula R'OCOOR" where each of R' and R" represents an alkyl, where R' is a linear, n-alkyl having less carbons than R" and where R" is an amyl.

15. The cell according to claim 14 where R' is a methyl.

16. A method for reducing the decomposition of an organic solvent consisting of one or more carbonates consisting of the elements carbon, hydrogen and oxygen; and for reducing.the formation of gaseous constituents in an electrochemical cell, said method comprising including in said solvent at least one of said carbonates being an asymmetric linear carbonate having a branched alkyl group, said carbonate characterized by lesser rate of gas formation during cycling of said cell as compared to linear dialkyl carbonate.

17. The method according to claim 16 wherein said solvent consists of a solvent mixture and said asymmetric carbonate constitutes less than 100 parts by weight of said solvent mixture.

18. A method for reducing the decomposition of an organic solvent and for reducing the formation of gaseous constituents in an electrochemical cell, said method comprising including in said solvent a dialkyl carbonate having an amyl group, said carbonate characterized by lesser rate of gas formation during cycling of said cell as compared to symmetric, linear dialkyl carbonate.

19. The method according to claim 18 wherein said solvent consists of a solvent mixture and said amyl-containing carbonate constitutes less than 100 parts by weight of said solvent mixture.

20. The battery of claim 1 wherein said solvent consists of ethylene carbonate, dimethyl carbonate and methyl isopropyl carbonate.

21. The battery of claim 1 wherein said solvent consists of said R'COOR", ethylene carbonate, and one or more of dimethyl carbonate and diethyl carbonate.

* * * * *